United States Patent
Seo

(10) Patent No.: US 8,913,163 B2
(45) Date of Patent: Dec. 16, 2014

(54) METHOD FOR DETECTING/CORRECTING BAD PIXEL IN IMAGE SENSOR

(75) Inventor: Phil Ki Seo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 818 days.

(21) Appl. No.: 13/142,240

(22) PCT Filed: Aug. 28, 2009

(86) PCT No.: PCT/KR2009/004831
§ 371 (c)(1),
(2), (4) Date: Jun. 24, 2011

(87) PCT Pub. No.: WO2010/074386
PCT Pub. Date: Jul. 1, 2010

(65) Prior Publication Data
US 2011/0254982 A1  Oct. 20, 2011

(30) Foreign Application Priority Data
Dec. 26, 2008  (KR) ........................ 10-2008-0134355

(51) Int. Cl.
H04N 9/64 (2006.01)
H04N 5/367 (2011.01)

(52) U.S. Cl.
CPC .................................... *H04N 5/367* (2013.01)
USPC .......................................... 348/247; 348/246

(58) Field of Classification Search
CPC ..................................................... H04N 5/367
USPC .......................................... 348/234, 246, 247
See application file for complete search history.

(56) References Cited

U.S. PATENT DOCUMENTS

| 7,061,533 | B1 | 6/2006 | Urushiya | |
|---|---|---|---|---|
| 7,564,491 | B2 | 7/2009 | Yoneda et al. | |
| 2002/0122123 | A1* | 9/2002 | Kimura | 348/246 |
| 2003/0179418 | A1* | 9/2003 | Wengender et al. | 358/437 |
| 2004/0165089 | A1* | 8/2004 | An | 348/246 |
| 2004/0179747 | A1* | 9/2004 | Matsumoto | 382/261 |
| 2006/0044425 | A1* | 3/2006 | Yeung et al. | 348/246 |
| 2008/0049125 | A1 | 2/2008 | Subbotin | |
| 2008/0117318 | A1* | 5/2008 | Aoki | 348/246 |
| 2008/0239114 | A1 | 10/2008 | Shin et al. | |
| 2009/0195677 | A1* | 8/2009 | Noh | 348/247 |

FOREIGN PATENT DOCUMENTS

| EP | 1 250 000 A2 | 10/2002 |
|---|---|---|
| JP | 02-205173 A | 8/1990 |
| JP | 10-322603 A | 12/1998 |
| JP | 2002-262132 A | 9/2002 |
| JP | 2004-207896 A | 7/2004 |
| KR | 10-2004-0076124 A | 8/2004 |
| KR | 10-2006-0077164 A | 7/2006 |
| KR | 10-2008-0050074 A | 6/2008 |
| KR | 10-2008-0087536 A | 10/2008 |

\* cited by examiner

*Primary Examiner* — Usman Khan
(74) *Attorney, Agent, or Firm* — Birch, Stewart, Kolasch & Birch, LLP

(57) ABSTRACT

Provided is a method for correcting a bad pixel in an image sensor. The method includes a first step of creating and storing a plurality of image frames of an object; a second step of scanning pixels in the image frames; a third step of storing, when a bad pixel is detected in the image frames, the location of the bad pixel as a bad block location in a memory; and a fourth step of correcting the luminance value of the bad block by calling the bad block location stored in the memory in an image capture operation.

10 Claims, 4 Drawing Sheets

Figure 4

| sub_B1 200 | sub_B2 200 | sub_B3 200 | sub_B4 200 |
|---|---|---|---|
| sub_B5 200 | sub_B6 50 | sub_B7 50 | sub_B8 200 |
| sub_B9 200 | sub_B10 50 | sub_B11 50 | sub_B12 200 |
| sub_B13 200 | sub_B14 200 | sub_B15 200 | sub_B16 200 |

(a)

| sub_B1 200 | sub_B2 200 | sub_B3 200 | sub_B4 200 |
|---|---|---|---|
| sub_B5 200 | sub_B6 200 | sub_B7 200 | sub_B8 200 |
| sub_B9 200 | sub_B10 200 | sub_B11 200 | sub_B12 200 |
| sub_B13 200 | sub_B14 200 | sub_B15 200 | sub_B16 200 |

(b)

METHOD FOR DETECTING/CORRECTING BAD PIXEL IN IMAGE SENSOR

TECHNICAL FIELD

The present disclosure relates to a method for detecting/correcting a bad pixel in an image sensor.

BACKGROUND ART

Image sensors are configured to include a pixel array including hundreds of thousands to millions of pixels, a device converting analog data detected from a pixel into digital data, and hundreds to thousands of storage devices. However, due to such many devices, the image sensors always have the possibility of a process error.

The quality of an image sensor is determined according to the number of bad pixels. That is, the quality of an image sensor becomes better as the number of bad pixels decreases. An error due to a bad pixel in an image sensor appears as a small dot on a screen.

If image sensor chips with partial bad pixels are all treated as bad chips, the production yield decreases. Therefore, the bad pixels are corrected for use.

A related art bad pixel correction method detects the luminance of an adjacent pixel and a bad pixel (i.e., a target pixel) or detects the R/G/B levels to check the difference, thereby correcting the next bad pixel in real time.

The related art bad pixel correction method is advantageous in terms of real-time correction. However, the related art bad pixel correction method has a difficulty in providing the accurate detection and complete correction of a bad pixel.

DISCLOSURE

Technical Problem

Embodiments provide a method for enabling the accurate detection and complete correction of a bad pixel.

Technical Solution

In one embodiment, a method for correcting a bad pixel in an image sensor includes: a first step of creating and storing a plurality of image frames of an object; a second step of scanning pixels in the image frames; a third step of storing, when a bad pixel is detected in the image frames, the location of the bad pixel as a bad block location in a memory; and a fourth step of correcting the luminance value of the bad block by calling the bad block location stored in the memory in an image capture operation.

Advantageous Effects

The embodiments make it possible to provide the accurate detection of a bad pixel even without using the related art real-time detection. Also, the embodiments correct a detected bad block by means of a difference ratio, thereby making it possible to provide the accurate correction of the bad block.

DESCRIPTION OF DRAWINGS

FIG. 4 is a diagram illustrating the luminance values of sub-blocks before correction and the luminance values of sub-blocks after correction.

BEST MODE

Figure 1:
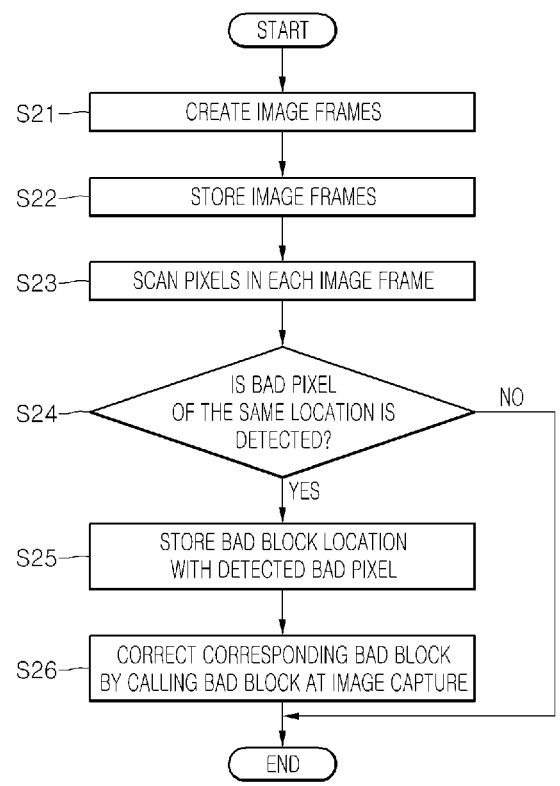
FIG. 1 is a flow chart illustrating a process of detecting/correcting a bad pixel in an image sensor according to an embodiment.

Hereinafter, embodiments will be described in detail with reference to the accompanying drawings. In every possible case, like reference numerals are used for referring to the same or similar elements in the description and drawings.

FIG. 1 is a flow chart illustrating a process of detecting/correcting a bad pixel in an image sensor according to an embodiment.

First, a plurality of object environments for correction is constructed, and image frames are captured and stored under the object environments.

The object environment is the luminance values of image frames that are necessary to correct a bad pixel of an image sensor.

For example, if a dead pixel generated in the image sensor appears as a black defect, the object environment means an environment where an object color is constructed by a bright color.

Thus, an image is captured under different object environments, and a plurality of image frames are created (S21) and stored (S22).

Figure 2:
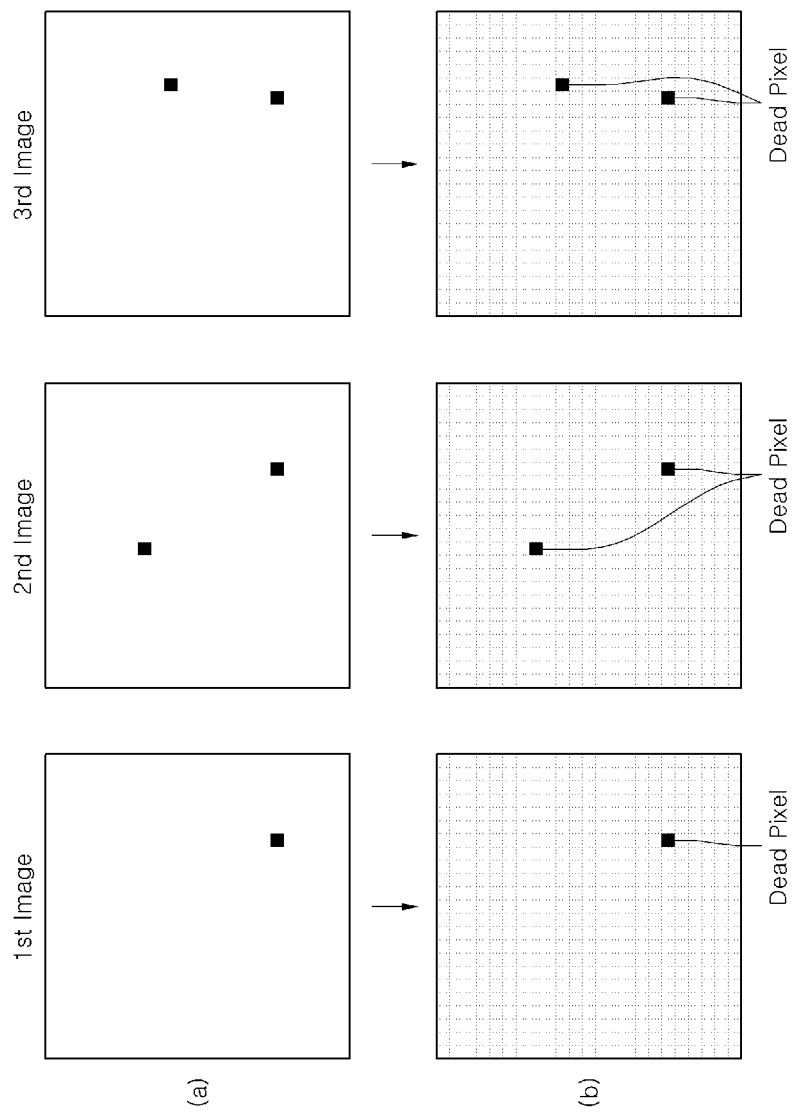
FIG. 2 is a diagram illustrating a scheme of detecting a bad block by storing a total of three image frames through object image capture according to an embodiment.

When the number of image frames is 3, it can be seen that a total of three image frames are created and stored by capturing bright object images of white, yellow and blue having a luminance value greater than or equal to a threshold value, as illustrated in FIG. 2(a).

The threshold value of the luminance value may be 200.

The three image frames need not have white, yellow and blue colors, and they may be captured in only one color.

Also, if the three image frames have a luminance value greater than or equal to a threshold value, they may be captured in the same brightness or in different brightness.

Pixels in each image frame are scanned (S23) to determine whether a bad pixel is detected (S24). For example, a bad pixel of a dead pixel always has a black luminance value greater than or equal to the threshold value. Herein, if such a black luminance value is present in each image frame, all of the corresponding pixel locations are determined as bad pixels.

Referring to FIG. 2(b), pixels in each image frame are scanned. Herein, if pixels with black defects appear in three image frames, the corresponding pixel locations are determined as bad pixels (dead pixels).

At this point, black defects may be formed at the same location or different locations in the three image frames, but all of the black defects formed in the three image frames may be determined as dead pixels.

That is, although a black defect does not appear in the first image frame, a black defect appearing in the second image frame is also determined as a dead pixel.

As above, if a bad pixel is detected in each image frame, the corresponding block including the bad pixel is stored as a bad block location in a memory (S25).

That is, a frame is divided into a plurality of blocks, and a block location including the bad pixel is stored as a bad block location in a memory.

After the bad block location is stored in the memory, when an image capture is performed, the corresponding bad block is corrected by calling the bad block location stored in the memory (S26).

If there are a plurality of bad blocks, after a correction is made by calling the first bad block location, a correction is mage by calling the next bad block location until it reaches the last bad block.

The bad block correction process (S26) will be described in detail with reference to FIG. 3.

Figure 3:
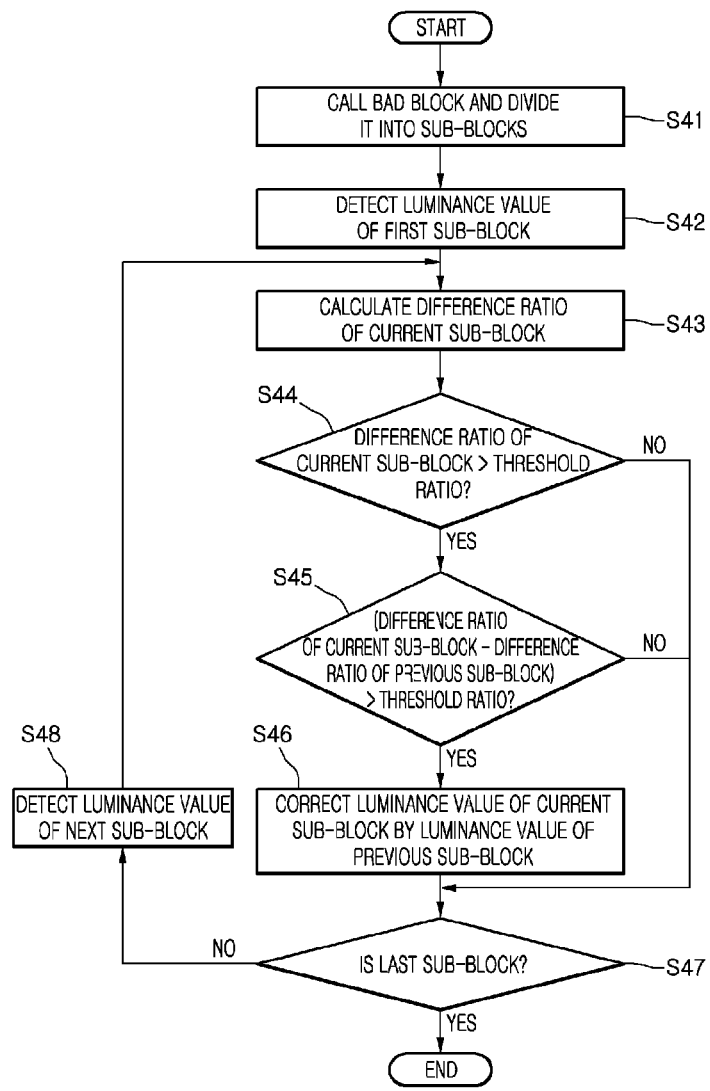
FIG. 3 is a flow chart illustrating a bad block correction process according to an embodiment.

FIG. 3 is a flow chart illustrating a bad block correction process according to an embodiment.

Hereinafter, a description will be given of an example where a bad block is divided into sub-blocks in order to reduce a system load.

Herein, the sub-blocks are blocks that are illustrated to make a comparison for only one of R/G/B colors in a pixel.

After a correction is made for one of R/G/B colors, a correction is made for the other colors in order.

When an image capture is performed, a bad block location stored in a memory is called and a bad block located in an image frame is divided into n*m sub-blocks (S41).

A luminance value of the first sub-block among the n*m sub-blocks is detected (S42).

Thereafter, a difference ratio of the first sub-block with respect to the previous sub-block is calculated (S43).

For reference, when the difference ratio of the first sub-block is calculated, the current sub-block means the first sub-block $sub\_B_1$ and the previous sub-block $sub\_B_{(x-1)}$ means the sub-block of another block located on the left of the first sub-block $sub\_B_1$.

The difference ratio of the current sub-block is the ratio of the absolute value of the difference between the previous sub-block $sub\_B_{(x-1)}$ and the current sub-block $sub\_B_x$ to the maximum luminance value of the previous sub-block $sub\_B_{(x-1)}$ and the current sub-block $sub\_B_x$, which is calculated as Equation 1.

$$\begin{aligned}\text{The difference ratio of the sub-block } sub\_B_x = \\ \{\text{The absolute value of the difference} \\ \text{between the previous sub-block } sub\_B_{(x-1)} \\ \text{and the current sub-block } sub\_B_x\} \div \\ \{\text{The maximum luminance value of the} \\ \text{previous sub-block } sub\_B_{(x-1)} \text{ and} \\ \text{the current sub-block } sub\_B_x\} = \\ |sub\_B_{(x-1)} - sub\_B_x| \div \text{Max}(sub\_B_{(x-1)}:sub\_B_x)\end{aligned}$$ [Equation 1]

Thereafter, it is determined whether the difference ratio of the current sub-block is greater than a predetermined threshold ratio (S44), and it is determined whether the difference between the difference ratio of the previous sub-block and the difference ratio of the current sub-block is greater than a threshold ratio (S45).

If it is greater than the threshold ratio (in steps S44 and S45), a correction is made by substituting the luminance value of the current sub-block by the luminance value of the previous sub-block (S46); and if not, no correction is made.

After the above correction, the luminance value of the next sub-block is detected (S48), the difference ratio of the corresponding sub-block is calculated by [Equation 1] (S43), and the steps S44 and S45 are repeated to correct the luminance value of the next sub-block (S46).

It is determined whether the sub-block is the last sub-block (S47). The above sub-block correction steps are repeated until it reaches the last sub-block.

For reference, when each sub-block has a luminance value as illustrated in FIG. 4(a), an example of the calculation of the difference ratio of each sub-block and the correction of each sub-block by the steps of FIG. 3 will be described below. FIG. 4(b) is a diagram illustrating the luminance value of each sub-block after the correction by the steps of FIG. 3.

A description will be given of the case where a bad block including 16 sub-blocks has a luminance value of each sub-block as illustrated in FIG. 4(a).

If sub-blocks 1, 2, 3, 4, 5, 8, 9, 12, 13, 14, 15 and 16 each have a luminance value of 200 and sub-blocks 6, 7, 10 and 11 each have a luminance value of 50, the first to fifth sub-blocks each have the same luminance value of 200.

Because there is no difference value of the previous sub-block, the sub-blocks 1, 2, 3 and 4 have a difference ratio of '0' in the case of substitution in Equation 1.

However, the sixth sub-block sub_B6 with a luminance value of 50 has a difference of 150 from the fifth sub-block sub_B5 with a luminance value of 200.

Thus, by substitution in Equation 1, the difference ratio of the sixth sub-block $sub\_B_6$ is calculated as follows.

$$\begin{aligned}\text{The difference ratio of the sixth sub-block } sub\_B_6 = \\ |sub\_B_5 - sub\_B_6| \div \text{Max}(sub\_B_5:sub\_B_6) = \\ |200 - 50| \div \text{Max}(200:50) = 150 \div 200 = 0.75\end{aligned}$$

In the result, it can be seen that the sixth sub-block has a difference ratio of 0.75 as illustrated in FIG. 4(b).

Thus, if a threshold ratio is 0.2, the difference ratio of 0.75 is greater than the threshold ratio of 0.2.

Also, because the difference between the difference ratio '0.75' of the sixth sub-block and the difference ratio '0' of the fifth sub-block (i.e., the previous sub-block) is greater than the threshold value '0.2', the luminance value of the sixth sub-block (i.e., the current sub-block) is substituted by the luminance value '200' of the fifth sub-block to make a correction.

After the sixth sub-block $sub\_B_6$ is corrected, the seventh sub-block (i.e., the next sub-block) is corrected. Herein, because the sixth sub-block (i.e., the previous sub-block) is already corrected, it has a corrected luminance value of 200. Accordingly, the sixth sub-block $sub\_B_6$ has a difference ratio of 0.

As above, the sixth sub-block is corrected to 200 and has a difference ratio of 0. Then, by substitution in Equation 1, the difference ratio of the seventh sub-block $sub\_B_7$ is calculated as follows.

$$\begin{aligned}\text{The difference ratio of the seventh sub-block } sub\_B_7 = \\ |sub\_B_6 - sub\_B_7| \div \text{Max}(sub\_B_6:sub\_B_7) = \\ |200 - 50| \div \text{Max}(200:50) = 150 \div 200 = 0.75\end{aligned}$$

In the result, it can be seen that the seventh sub-block has a difference ratio of 0.75 as illustrated in FIG. 4(b).

Thus, because the difference ratio of 0.75 is greater than the threshold ratio of 0.2 and the difference between the difference ratio '0.75' of the seventh sub-block and the difference ratio '0.2' of the sixth sub-block (i.e., the previous sub-block) is greater than the threshold ration of 0.2, the luminance value of the seventh sub-block is substituted by the luminance value of the sixth sub-block to make a correction.

Likewise, through the above steps, the tenth and eleventh sub-blocks can also be corrected to 200 by substitution.

At this point, in the description of the steps of FIGS. 1 and 3, the bad block in the image frame is detected, the difference ratios of the sub-blocks of the corresponding bad block are detected, and whether to correct it is determined according to the difference.

As described above, a bad pixel of the image frame is detected through the steps of FIGS. 1 and 3, and a block location including the bad pixel is stored as a bad block location in the memory.

Then, when an image capture is performed, the location information of bad blocks in the image frame is retrieved from the memory, and the sub-blocks in the corresponding block are corrected. As described above, the correction in the step S26 of FIG. 1 may be performed through the correction algorithm of FIG. 3. However, the block stored as a bad block may be directly substituted by the value of the previous sub-block without calculating the difference ratio of each sub-block.

That is, the block determined as a bad block may be corrected by substituting the value of the previous sub-block by the value of the bad block, regardless of the threshold ratio.

Also, as another example of the correction in the step S26 of FIG. 1, the location of the corresponding bad block is directly designated and set in a correction register of the image sensor, so that the corresponding block can be automatically corrected in an image capture operation.

In general, an image sensor with the correction function has a correction register, and the block of a specific location is corrected according to the setting value of the correction register.

Thus, the location of the bad block detected through the above steps are set and written in the correction register of the image sensor, so that the block of the corresponding location is corrected in an image capture operation.

If a correction target block is determined by the setting value of the correction register, the correction through the register may be performed by the correction algorithm of FIG. 3. Also, the correction may be performed by other correction algorithms.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

The embodiments are applicable to a method for detecting/correcting a bad pixel in an image sensor.

The invention claimed is:

1. A method for correcting a bad pixel in an image sensor by an image capturing system having the image sensor, comprising:

a first step of creating and storing a plurality of image frames of an object;
a second step of scanning pixels in the image frames;
a third step of storing, when a bad pixel is detected in the image frames, the location of the bad pixel as a bad block location in a memory; and
a fourth step of correcting the luminance value of the bad block by calling the bad block location stored in the memory in an image capture operation,
wherein the fourth step comprises:
a fifth step of dividing the image frame into a plurality of sub-blocks by calling the block according to the bad block location stored in the memory;
a sixth step of detecting the luminance value of the first sub-block;
a seventh step of calculating the difference ratio of the current sub-block by setting the difference ratio of the sub-block to the ratio of the luminance value difference between the previous sub-block and the current sub-block;
a eighth step of comparing the difference ratio of the current sub-block with a predetermined threshold ratio and determining whether to correct the luminance value of the current sub-block according to the comparison result; and
a ninth step of repeating the seventh step and the eighth step by detecting the luminance value of the next sub-block until the last sub-block, and
wherein the difference ratio of the sub-block is calculated by {The absolute value of the difference between the luminance value of the previous sub-block $sub\_B_{(x-1)}$ and luminance value of the current sub-block $sub\_B_x$}÷{The maximum value which is one of the luminance value of the previous sub-block $sub\_B_{(x-1)}$ and the luminance value of the current sub-block $sub\_B_x$}.

2. The method according to claim 1, wherein the image frames have the same brightness environment.

3. The method according to claim 1, wherein the image frames have different brightness environments.

4. The method according to claim 1, wherein the brightness environment is a brightness environment with a luminance value greater than or equal to a threshold value.

5. The method according to claim 4, wherein the threshold value is 200 lx.

6. The method according to claim 1, wherein all the pixels with a black luminance value in each of the image frames are determined as bad pixels in the third step.

7. The method according to claim 1, wherein if there is a correction register performing a correction control in the image sensor in an image capture operation, the fourth step corrects the luminance value of the bad block by performing the setting in the correction register according to the bad block location stored in the memory.

8. The method according to claim 1, wherein the fourth step calls the bad block location stored in the memory and substitutes the same by the same luminance value as the previous block of the bad block.

9. The method according to claim 1, wherein the predetermined threshold ratio is 0.2.

10. The method according to claim 1, wherein the eighth step substitutes the luminance value of the current sub-block by the luminance value of the previous sub-block if the difference ratio of the current sub-block is greater than the predetermined threshold ratio and the difference between the difference ratio of the current sub-block and the difference ratio of the previous sub-block is greater than the threshold ratio.

* * * * *